United States Patent
Hall et al.

(10) Patent No.: US 8,504,550 B2
(45) Date of Patent: *Aug. 6, 2013

(54) SOCIAL NETWORK MESSAGE CATEGORIZATION SYSTEMS AND METHODS

(75) Inventors: Michael Aaron Hall, Valencia, CA (US); Daniel Benyamin, Beverly Hills, CA (US); Aaron Chu, Los Angeles, CA (US)

(73) Assignee: CitizenNet Inc., Beverly Hills, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 12/781,799

(22) Filed: May 17, 2010

(65) Prior Publication Data

US 2010/0293170 A1    Nov. 18, 2010

Related U.S. Application Data

(60) Provisional application No. 61/178,619, filed on May 15, 2009.

(51) Int. Cl.
*G06F 7/00* (2006.01)
*G06F 17/30* (2006.01)

(52) U.S. Cl.
USPC ............ 707/710; 707/781; 707/748; 707/771

(58) Field of Classification Search
None
See application file for complete search history.

(56) References Cited

U.S. PATENT DOCUMENTS

| | | | |
|---|---|---|---|
| 5,465,309 A | 11/1995 | Johnson | |
| 5,835,087 A * | 11/1998 | Herz et al. | 715/810 |
| 5,999,902 A | 12/1999 | Scahill et al. | |
| 6,515,681 B1 | 2/2003 | Knight | |
| 6,571,225 B1 * | 5/2003 | Oles et al. | 706/12 |
| 6,571,234 B1 | 5/2003 | Knight et al. | |
| 6,766,349 B1 | 7/2004 | Belkin | |
| 7,080,139 B1 | 7/2006 | Briggs et al. | |
| 7,089,226 B1 * | 8/2006 | Dumais et al. | 707/740 |
| 7,421,395 B1 | 9/2008 | Link et al. | |
| 7,603,349 B1 * | 10/2009 | Kraft et al. | 1/1 |
| 7,657,515 B1 | 2/2010 | Jewell | |
| 7,734,627 B1 | 6/2010 | Tong | |
| 7,743,051 B1 | 6/2010 | Kashyap et al. | |
| 7,860,928 B1 * | 12/2010 | Anderson | 709/204 |
| 7,917,528 B1 | 3/2011 | Dave et al. | |
| 7,925,496 B1 | 4/2011 | Rubin | |
| 8,086,631 B2 | 12/2011 | Gollapudi et al. | |
| 8,301,616 B2 | 10/2012 | Guha et al. | |
| 2002/0016787 A1 | 2/2002 | Kanno | |

(Continued)

OTHER PUBLICATIONS

Avancini et al. "Automatic Expansion of Domain-Specific Lexicons by Term Categorization", ACM Transactions on Speech and Language Processing, vol. 3, No. 1, May 2006, pp. 1-30.*

(Continued)

*Primary Examiner* — Polina Peach

(74) *Attorney, Agent, or Firm* — Kauth, Pomeroy, Peck & Bailey LLP

(57) ABSTRACT

Systems and methods of identifying and categorizing social network messages that are relevant to selected categories and text terms are provided. The frequency of text terms appearing in social network messages are calculated for multiple categories. Based on the calculated text term frequency, social network messages can be identified and/or categorized that match a provided set of text terms. Selecting and/or associating text terms and categories are determined by repeatedly analyzing social network messages.

17 Claims, 4 Drawing Sheets

(56) References Cited

U.S. PATENT DOCUMENTS

| | | | |
|---|---|---|---|
| 2002/0062368 A1* | 5/2002 | Holtzman et al. | 709/224 |
| 2003/0028595 A1 | 2/2003 | Vogt et al. | |
| 2003/0164855 A1 | 9/2003 | Grant et al. | |
| 2005/0080613 A1* | 4/2005 | Colledge et al. | 704/9 |
| 2005/0080856 A1* | 4/2005 | Kirsch | 709/206 |
| 2005/0204002 A1 | 9/2005 | Friend | |
| 2006/0069589 A1* | 3/2006 | Nigam et al. | 705/1 |
| 2006/0242128 A1 | 10/2006 | Goel | |
| 2006/0253437 A1 | 11/2006 | Fain et al. | |
| 2006/0282328 A1 | 12/2006 | Gerace et al. | |
| 2007/0106500 A1* | 5/2007 | Loofbourrow et al. | 704/10 |
| 2007/0124432 A1 | 5/2007 | Holtzman et al. | |
| 2007/0260580 A1* | 11/2007 | Omoigui | 707/2 |
| 2007/0288433 A1 | 12/2007 | Gupta et al. | |
| 2008/0021884 A1 | 1/2008 | Jones et al. | |
| 2008/0059488 A1 | 3/2008 | Iyengar et al. | |
| 2008/0091670 A1 | 4/2008 | Ismalon | |
| 2008/0140502 A1 | 6/2008 | Birnholz et al. | |
| 2008/0172368 A1 | 7/2008 | Chowdhury et al. | |
| 2008/0222142 A1 | 9/2008 | O'donnell | |
| 2008/0243842 A1 | 10/2008 | Liang et al. | |
| 2008/0294624 A1 | 11/2008 | Kanigsberg et al. | |
| 2009/0049127 A1* | 2/2009 | Juan et al. | 709/204 |
| 2009/0063469 A1* | 3/2009 | Gross | 707/5 |
| 2009/0070219 A1 | 3/2009 | D'angelo et al. | |
| 2009/0070346 A1 | 3/2009 | Savona et al. | |
| 2009/0109872 A1 | 4/2009 | Skubacz et al. | |
| 2009/0119167 A1 | 5/2009 | Kendall et al. | |
| 2009/0119261 A1 | 5/2009 | Ismalon | |
| 2009/0171686 A1 | 7/2009 | Eberstadt | |
| 2009/0177754 A1 | 7/2009 | Brezina et al. | |
| 2009/0216696 A1 | 8/2009 | Downs et al. | |
| 2009/0276285 A1 | 11/2009 | Nomula | |
| 2010/0049534 A1 | 2/2010 | Whitnah et al. | |
| 2010/0169327 A1 | 7/2010 | Lindsay et al. | |
| 2010/0223279 A1 | 9/2010 | Scott | |
| 2010/0268628 A1 | 10/2010 | Pitkow et al. | |
| 2010/0293170 A1 | 11/2010 | Hall et al. | |
| 2010/0306249 A1* | 12/2010 | Hill et al. | 707/769 |
| 2011/0060794 A1 | 3/2011 | Sweeney | |
| 2011/0078130 A1 | 3/2011 | Roizen et al. | |
| 2011/0093455 A1 | 4/2011 | Benyamin et al. | |
| 2011/0145348 A1 | 6/2011 | Benyamin et al. | |
| 2012/0004959 A1 | 1/2012 | Benyamin et al. | |
| 2012/0158489 A1 | 6/2012 | Benyamin et al. | |
| 2012/0158518 A1 | 6/2012 | Benyamin et al. | |
| 2012/0259619 A1 | 10/2012 | Hall | |

OTHER PUBLICATIONS

Natalie Glance, Matthew Hurst, Kamal Nigam, Matthew Siegler, Robert Stockton, Takashi Tomokiyo "Deriving Marketing Intelligence from Online Discussion", KDD'05, Aug. 21-24, 2005.*

"Automatic Expansion of Domain-Specific Lexicons by Term Categorization", ACM Transactions on Speech and Language Processing, vol. 3, No. 1, May 2006, pp. 1-30.

Ambekar et al., "Name-Ethnicity Classification from Open Sources", KDD '09, Jun. 28-Jul. 1, 2009, 9 pgs.

Androutsopoulos et al., "An Evaluation of Naive Bayesian Anti-Spam Filtering", Proceedings of the workshop on machine Learning in the New Information Age, 2000, pp. 9-17.

Argamon et al., "Gender, Genre and Writing Style in Formal Written Texts", Source and date unknown, 32 pgs.

Backstrom et al., "Find Me if You Can: Improving Geographical Prediction with Social and Spatial Proximity", WWW, 2010, 10 pgs.

Backstrom et al., "Network Bucket Testing", Source and date unknown, 10 pgs.

Bakshy et al., "Everyone's an Influencer: Quantifying Influence on Twitter", WSDM '11, Feb. 9-12, 2011, 10 pgs.

Bakshy et al., "The Role of Social Networks in Information Diffusion", Source and date unknown, 9 pgs.

Bernstein et al., "Eddi: Interactive Topic-based Browsing of Social Status Streams", UIST, 2010, 10 pgs.

Berwick, "An Idiot's Guide to Support Vector Machines (SVMs)", Source and date unknown, 25 pgs.

Blei et al., "Latent Dirichlet Allocation", Source and date unknown, 8 pgs.

Bollen et al., "Modeling public mood and emotion: Twitter sentiment and socio-economic phenomena", WWW, Apr. 2010, 10 pgs.

Burke et al., "Feed Me: Motivating Newcomer Contribution in Social Network Sites", CHI 2009, Apr. 4-9, 2009, 10 pgs.

Burke et al., "Social Capital on Facebook: Differentiating Uses and Users", CHI, 2011, 10 pgs.

Burke et al., "Social Network Activity and Social Well-Being", CHI 2010, 4 pgs.

Cer et al., "Parsing to Stanford Dependencies: Trade-offs between speed and accuracy", Source and date unknown, 5 pgs.

Chang, "Not-So-Latent Dirichlet Allocation: Collapsed Gibbs Sampling Using Human Judgments", Proceedings of the NAACL HLT 2010 Workshop on Creating Speech and Language Data with Amazon's Mechanical Turk, pp. 131-138.

Chang et al., "ePluribus: Ethnicity on Social Networks", Association for the Advancement of Artificial Intelligence, 2010, 8 pgs.

Ghosh et al., "Community Detection Using a Measure of Global Influence", 2nd SNA-KDD Workshop, 2008, 9 pgs.

Ghosh et al., "Structure of Heterogeneous Networks", Source unknown, Jun. 11, 2009, 8 pgs.

Go et al., "Twitter Sentiment Analysis", CS224N—Final Project Report, Jund 6, 2009, 17 pgs.

Go et al., "Twitter Sentiment Classification Using Distant Supervision", Source and date unknown, 6 pgs.

Hearst, "Trends & Controversies—Support Vector Machines", IEEE Intelligent Systems, Jul./Aug. 1998, pp. 18-28.

Joachims, "Text Categorization with Support Vector Machines: Learning with Many Relevant Features", Universitat Dortmund Fachbereich Informatik, Nov. 1997, 18 pgs.

Kim et al., "Literary Style Classification with Deep Linguistic Analysis Features", Source and date unknown, 7 pgs.

Kintsch, "Predication", Source and date unknown, 40 pgs.

Kintsch, "The Role of Knowledge in Discourse Comprehension: A Construction-Integration Model", Psychological Review, 1988, vol. 95, No. 2, pp. 163-182.

Kramer, "An Unobtrusive Behavioral Model of "Gross National Happiness"", CHI 2010: Language 2.0, Apr. 10-15, 2010, pp. 287-290.

Lerman, "Semantic Labeling of Online Information Sources", Source and date unknown, 19 pgs.

Li et al., "Keyword Extraction for Social Snippets", WWW 2010, Apr. 26-30, 2010, 2 pgs.

Lu et al., "Opinion Integration Through Semi-supervised Topic Modeling", WWW 2008, Refereed Track: Data Mining—Modeling, Apr. 21-25, 2008, pp. 121-130.

Meyer, "Support Vector Machines", Source unknown; Sep. 12, 2011, pp. 1-8.

Mishne, "Experiments with Mood Classification in Blog Posts", Style 2005, 8 pgs.

Pang et al., "Opinion Mining and Sentiment Analysis", Foundations and Trends in Information Retrieval, 2008, vol. 2, Nos. 1-2, pp. 1-135.

Ratkiewicz et al., "Detecting and Tracking the Spread of Astroturf Memes in Microblog Streams", Source unknown, Nov. 2010, 10 pgs.

Scott et al., "Text Classification Using WordNet Hypernyms", Source and date unknown, pp. 45-51.

Sun et al., "Gesundheit! Modeling Contagion through Facebook News Feed", Association for the Advancement of Artificial Intelligence, 2009, 8 pgs.

Tyler et al., "Retrieval Models for Audience Selection in Display Advertising", CIKM 2011, 6 pgs.

Wallach, "Topic Modeling: Beyond Bag-of-Words", Source unknown, Jun. 26, 2006, 40 pgs.

Wilson et al., "Term Weighting Schemes for Latent Dirichlet Allocation", Human Language Technologies: The 2010 Annual Conference of the North American Chapter of the ACL, pp. 465-473.

Zheng et al., "A Framework for Authorship Identification of Online Messages: Writing-Style Features and Classification Techniques", Journal of the American Society for Information Science and Technology, 2006, vol. 57, No. 3, pp. 378-393.

Acar et al., "Modeling and Multiway Analysis of Chatroom Tensors", ISI'05 Proceedings of the 2005 IEEE international conference on Intelligence and Security Informatics, 13 pgs.

Gamon, "Sentiment classification on customer feedback data: noisy data, large feature vectors, and the role of linguistic analysis", Proceedings of the 20th international conference on Computational Linguistics, Association for Computational Linguistics, 2004, 7 pgs.

Garg et al., "Understanding Probabilistic Classifiers", Machine Learning: ECML 2001, 179-191.

Hein, "How Search Really Works: The Keyword Density Myth", Search Engine People, found on line at www.searchenginepeople.com/blog/how-search-really-works-the-keyword-density-myth.html, Feb. 1, 2008, 3 pgs.

Liu et al., "Personalized Web Search for Improving Retrieval Effectiveness", IEEE Transactions on Knowledge and Data Engineering, vol. 16, No. 1, Jan. 2004, pp. 1-25.

Pearlman, "Facebook Ads", The Facebook Blog, found on line at blog.facebook.com/blog.php?post=6972252130, Nov. 6, 2007, 2 pgs.

* cited by examiner

SOCIAL NETWORK MESSAGE CATEGORIZATION SYSTEMS AND METHODS

CROSS REFERENCE TO RELATED APPLICATIONS

This application claims the benefit of U.S. Provisional Patent Application No. 61/178,619, filed on May 15, 2009, the disclosure of which is hereby incorporated by reference as if set forth in full herein.

BACKGROUND

The present invention relates to textual classification systems, and in particular, to social network message categorization and identification systems and methods.

The Internet is a tremendous source of information, but finding a desired piece of information has been the preverbal "needle in the haystack". For example, services like blogs provide data miners a daunting task of perusing through extensive amounts of text in order to find data that can become applicable for other uses. Hence, text data mining and information retrieval systems designed for large collections of lengthy documents have arisen out of the practical need of finding a piece of information in the massive collections of varied documents (such as the World Wide Web) or in databases of professional documents (such as medical or legal documents). Likewise, with the popularity of social networking increasing every day, the amount of user-generated content from these social networking sites continues to grow. Thus, finding information that is relevant and useable is quickly becoming more difficult.

These popular social networking services or options, like Twitter messages or Facebook statuses, are typically much shorter in length than full web pages. This brevity however makes it increasingly difficult to use current filtering techniques specifically designed to sort through large amounts of data. For example, popular techniques, such as term frequency-inverse document frequency (TF-IDF) weighting, are dependent on both the collection of information, as well as the average document size, to be large.

Additionally, in recent years there has been an increase in the number of very short documents, usually in the form of user generated messages or comments. Typical user generated messages have come from a number of sources, for example, instant messaging programs, such as AOL instant messenger; online chat rooms; text messages from mobile phones; message publication services, such as Twitter; and "Status" messages, such as those on Facebook pages. Thus, with the rising popularity of these messaging services, there has become a need to search the messages for their content. Some techniques of searching short messages consist simply of doing regular expression matching. However, these techniques typically fail when a term being searched is ambiguous and/or used in unrelated topics. For example, searching for "Amazon" could result in finding messages about the Amazon river and the online retailer, Amazon. Also, if additional terms are provided, many relevant messages may be omitted. For example, searching for "Amazon river" would not match the message "Hiked to the Amazon today—what a beautiful jungle this is", whereas a webpage or a large document about the Amazon river would likely contain both the words "Amazon" and "river", while a short message may not.

Accordingly, there is a need to provide messaging categorization systems and methods to identify relevant social network messages while overcoming the obstacles and shortcomings previously noted and recognized in the art.

SUMMARY

Generally, systems and methods of identifying and categorizing messages that are relevant to selected categories and terms are provided.

In one embodiment, a method of textual categorization of social network messages is provided. The method comprises scoring one or more messages from one or more social network messaging services based on one or more text terms for a determined category by a message server; matching the one or more scored messages to one or more text terms from a query; and returning one or more messages having a final score that equals or exceeds a threshold value for the determined category, the final score being based on scores of the scored messages and match values of the matched messages. The messages in one embodiment are scored based on text term frequency calculations associated with the one or more text terms.

The above-mentioned and other features of this invention and the manner of obtaining and using them will become more apparent, and will be best understood, by reference to the following description, taken in conjunction with the accompanying drawings. The drawings depict only typical embodiments of the invention and do not therefore limit its scope.

DETAILED DESCRIPTION

Figure 1:
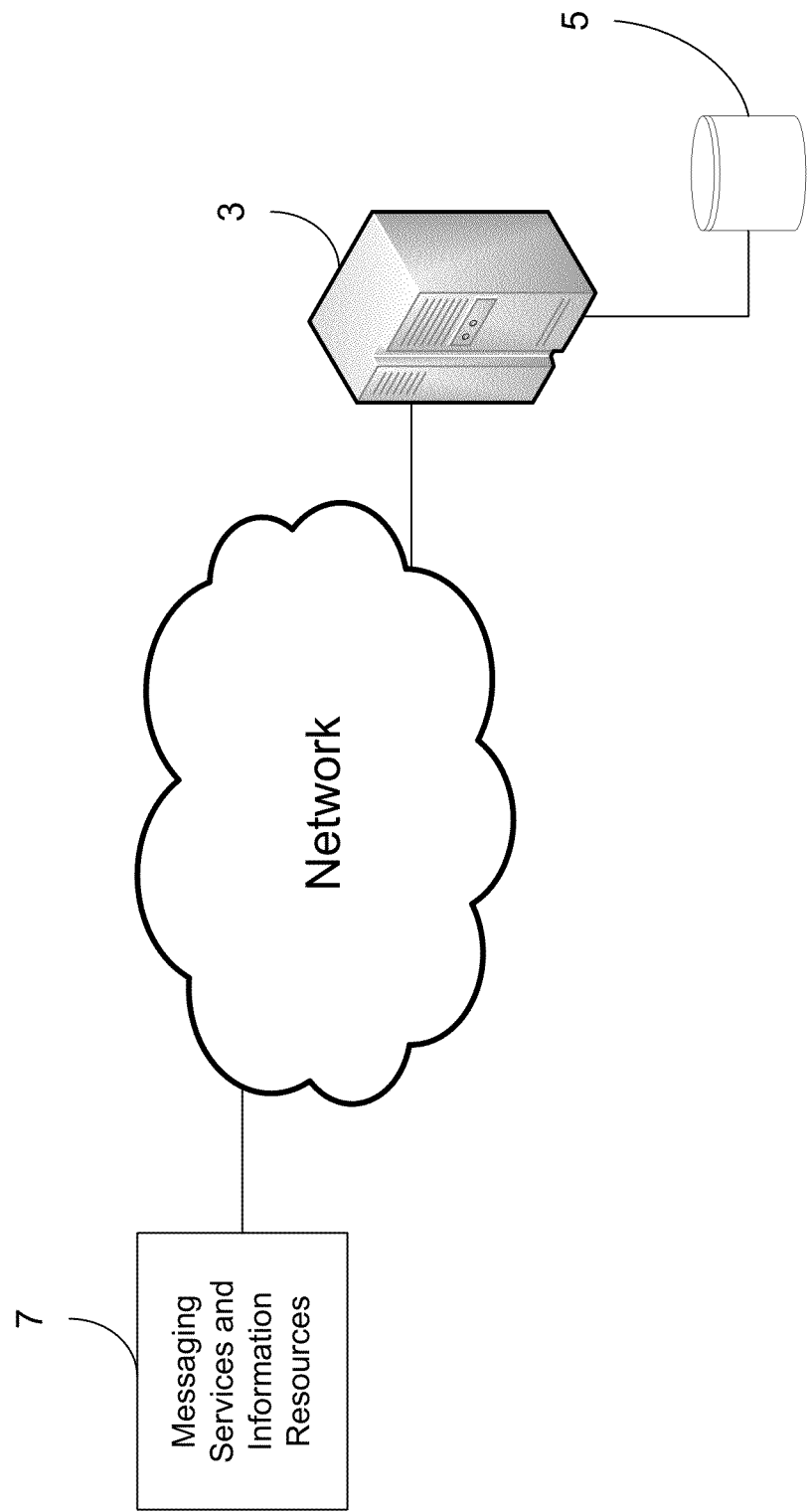
FIG. 1 is a block diagram illustrating a messaging classification and retrieval system in accordance with various embodiments of the invention.

Generally, a message categorization system is provided in which categories are set up with associated keywords in which short or social network messages are identified and placed in an appropriate category. In various embodiments, categories are subject or topic containers that include, but are not limited, to a person, place or thing. Keywords extracted from short messages that are relevant to a category are associated with the corresponding category. For every message a score is assigned to the message for each category. In one embodiment, a query for information on a specific topic can identify the best message or messages by identifying the appropriate category and utilizing the best scored messages for the identified category in conjunction with an amount of keywords that match between the message and the query.

Categories and Keywords

Categories of interest are generated by identifying a specific subject or topic, such as a person, place or an object. The categories in one embodiment are refined based on usage performance. In particular, categories focused on things perform well with narrower descriptions having a better performance. For example, a category such as "sports" would not perform as well as "basketball", which would not perform as well as "UCLA basketball". These fine grained categories however can come at the cost of increased processing time and storage. In one embodiment, each category is unique having no overlap with other categories.

For each category generated, one or more keywords or text terms are identified and associated with each category. In one embodiment, keywords are stored in tables in which each category may have multiple tables. The keywords that are stored come from messages in the desired medium. As such, in one embodiment, within each category, there is a specific table with one or more specific keywords for each medium. Each medium, e.g., messaging service, can have different message formats and/or terminology used. For example, text messages from a mobile phone can and will often look quite different from messages posted to Facebook. Thus, keywords from other sources in one embodiment are only used as a query into the desired message format. In this way the keyword tables would account for slang terms and other such differentiators specific to the medium. One or more of the following processes can be used to identify the keywords.

Unambiguous Training

For a given category, e.g., musical artists, there can be ambiguous and unambiguous terminology. For example, an artist name can be ambiguous ("No Doubt") or unambiguous ("Metallica"). Utilizing unambiguous terminology, every keyword used in a message containing "Metallica" would be stored, and the usage frequencies of the keywords would be used as a measure of how related to the musical artist category a given query would be.

User Tagging

A message database in one embodiment would allow for manual tagging of information. These tags are created by users as a means to self-classify messages. One example is preceding a tag name with a unique character, e.g., a "#" character. For example, if a message contains "#oscars", then presumably the message is about the Oscars awards ceremony. As such, keywords about the Oscars awards ceremony can be generated by finding every message with the "#oscars" tag, and store each of the keywords present in the located messages. The resulting table would thus include words commonly used to describe the ceremony, and thus using the table a message that did not have a "#oscars" tag could still be located.

Third-Party Information

In one embodiment, a third party database or similar resource can be used to identify keywords. For example, utilizing a resource, such as Wikipedia, as a large collection of words related to a category, a TF-IDF analysis of this resource would yield the most important keywords for a given category. Messages could be searched to locate messages that used these keywords in which each of the resulting message-based keywords are stored in the associated category's table.

Category and Message Scoring

A message score for a given category is a measure of how likely its keywords are present in all the messages related to the category. The message scores are defined by $$\text{score}(m, c) = \sum_{g \in m} f(P(g, c))$$

where m is a given message, c is a given category, g is a keyword in the message, and P(g,c) is the normalized frequency of a message in category c containing the keyword g. The function f is a thresholding or quantization function.

Quantization Function f

Most category tables have probability distributions that follow a power-law distribution. However, the resulting tables may have a large number of small values, or conversely, a small number of large values. In such cases it may be helpful to pass this table through a quantization function. The simplest function is simply a threshold, by which any keywords that do not pass the threshold have frequencies set to 0. More complex quantizers are used to simplify the table, boost certain values, or otherwise be shaped to improve the scoring performance.

A final message score is defined as $w_{score} \cdot \text{score}(m, c_q) + w_{match} \cdot \text{match}(m, q)$, where w is a weight [0 . . . 1], $\text{score}(m, c_q)$ is the score of the message in the query's category, and match (m,q) is the percentage of keywords that match between message m and the query q. This value is used to ensure that the messages have some similarity, even if they both score high in each category. In one embodiment, the final message score can be defined as $\text{score}(m, c_q)$ which can be useful to obtain all relevant messages in a query's category and/or based on a threshold value or score. The inclusion of weight $w_{score}$ and/or $w_{match}$ can be used to further refine these messages to provide messages that more closely match the query.

Referring now to an example, if the query is "Amazon river", then this query would rank high in a category about rivers, the Amazon jungle, or even geographical categories. This query however would score lower in categories about companies, as the term "river" would not occur very frequently in these categories. Similarly, the message "Hiked to the Amazon today—what a beautiful jungle this is" would also rank high in the category of geographical messages, as the keywords "hiked" and "jungle" would appear often in such categories. Finally, the message matches 50% of the terms in the query (i.e., "Amazon"), ensuring that the message has a relation to the query and not just the category as a whole.

Referring now to drawings, a message categorization system is shown in FIG. 1. The system includes a message server 3 that is coupled with a message database 5 and is in network communication with a plurality of messaging services and information sources 7. The message server receives user generated messages from the plurality of messaging services and information sources. The received messages are stored in category records in the message database and keywords are selected from the received messages and associated with the category records. The message server also scores each message which is stored in the message database and associated with the corresponding category records.

The message server 3 also receives queries externally from, for example, messaging services or web servers or internally, for example, through a user interface in communication with the message server. For each received query, the message server calculates a score that identifies a specific category. Utilizing the score, the server retrieves the associated category record from the message database. Messages stored or associated with the category record is retrieved by the server and transmitted back to a designated recipient, e.g., the sender of the query or search request. In one embodiment, the message server calculates or retrieves a final message score for the identified category for the stored messages. Utilizing the final message score, the server selects specific messages stored or associated with the category record for transmission to a designated recipient.

Figure 2:
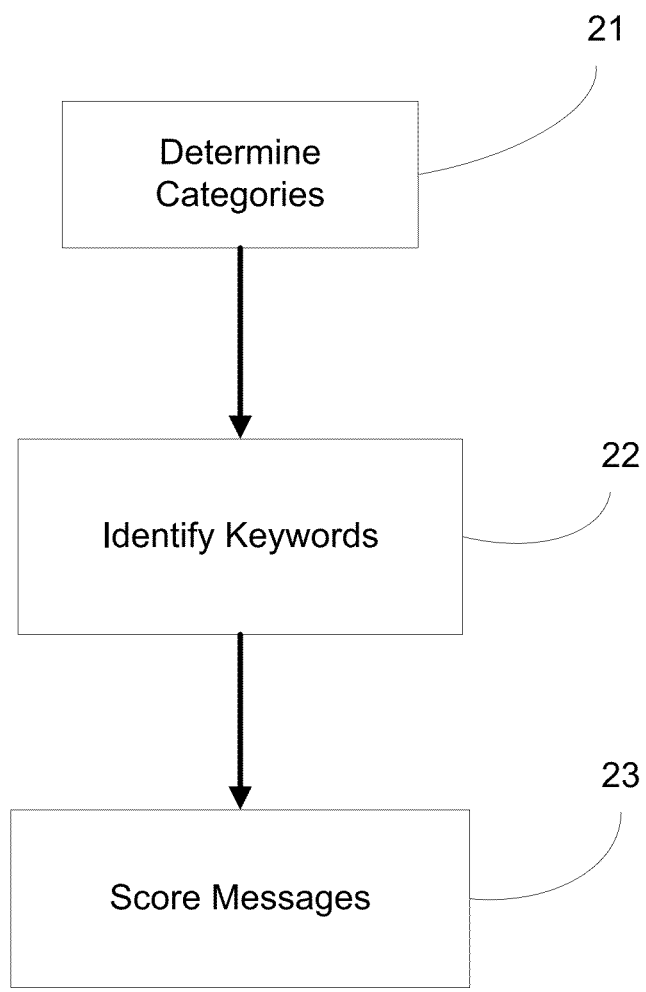
FIG. 2 is a flowchart illustrating a messaging classification generation process in accordance with various embodiments of the invention.

In FIG. 2, a messaging classification generation process in accordance with various embodiments of the invention is illustrated. Initially, categories are first determined (21). Keywords are identified and used to populate tables for each determined category (22). In one embodiment, a medium is identified and used to select tables in which to populate with the keywords identified. Each message received is scored for each determined category (23).

Figure 3:
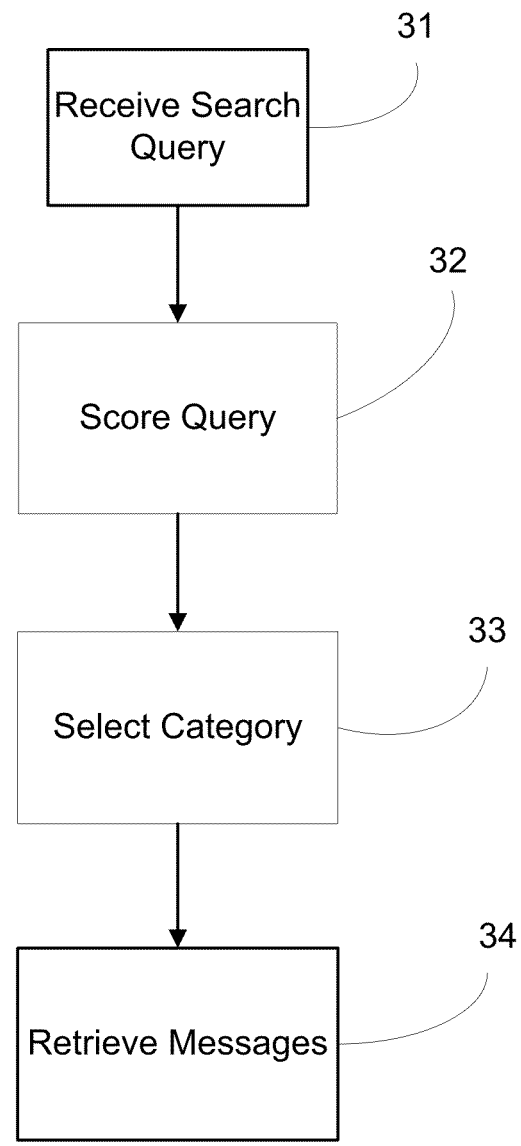
FIG. 3 is a flowchart illustrating a messaging classification retrieval process in accordance with various embodiments of the invention.

Referring now to FIG. 3, a messaging classification retrieval process starts with a query request being received (31). The request is scored for each category (32) and the category with the highest query score is selected (33). Messages with the highest score in this category and that contain some of the matched terms are returned as the message results (34). In one embodiment, terms or words are extracted from the query and matched to keywords for the determined category.

Referring back to the "Amazon river" query example, two potential categories are established. It would be appreciated that the number of categories may be varied and numerous along with the associated keywords and messages, but are shown here in a limited fashion to facilitate the description of the invention. The first category is a geographical location category and the second category is a company category. As shown in the following tables, each category includes a set of keywords with associated normalized keyword frequency calculations.

TABLE 1

Geographical Location

| Normalized Keyword Frequency | Keywords |
|---|---|
| 0.2 | river |
| ... | ... |
| 0.05 | jungle |
| 0.05 | Amazon |
| 0.005 | hike |

TABLE 2

Company

| Normalized Keyword Frequency | Keywords |
|---|---|
| 0.5 | revenue |
| 0.2 | employee |
| 0.01 | Amazon |
| ... | ... |
| 0.0005 | jungle |
| 0.0001 | hike |

Utilizing the tables and in particular matching the keywords of each category with the terms in the query, a query score is determined utilizing the associated normalized keyword frequency calculations. For example, the query score for the geographical location category is 0.25 (0.2 (river)+0.05 (Amazon)). Likewise, the query score for the company category is 0.01 (0.01 (Amazon)+0 (river)).

Given a first message, "Hiked to the Amazon today, what a beautiful jungle this is" and a second message, "Amazon announced revenue up 38%", messages scores can also be generated by matching keywords for each category and utilizing the associated normalized keyword frequency calculations. For example, the message score for the first message in the geographical category is 0.105 (0.05 (jungle)+0.05 (Amazon)+0.005 (hike)) and in the company category is 0.0106 (0.01 (Amazon)+0.0005 (jungle)+0.0001 (hike)). The second message score for the geographical category is 0.05 (Amazon) and for the company category 0.51 (0.5 (revenue)+0.01 (Amazon)).

Since the query score for the geographic category (0.25) is higher or larger than the query score for the company category (0.1), the geographic location category is selected to utilized the message scores for each of the messages. Thus, score (m1, geographic)=0.105 and score (m2, geographic)=0.05, where m1 and m2 are respective first and second messages. Since in the provided example, the search query is short, only one term matches, i.e., Amazon. Thus, the match values for each message are match(m1, q)=0.5 and match(m2, q)=0.5, where q is the query. Accordingly, the final score disregarding weight factors shows that the first message has a final score of 0.605 (0.105+0.5) greater than the final score of 0.55 (0.05+0.5) for the second message. Thus, the first message being the most relevant is provided as the search result for the given search query. In one embodiment, the match value is zeroed or ignored which can be useful to provide all messages limited only by, for example, a score at or above a particular threshold score as the search results for the given query.

Figure 4:
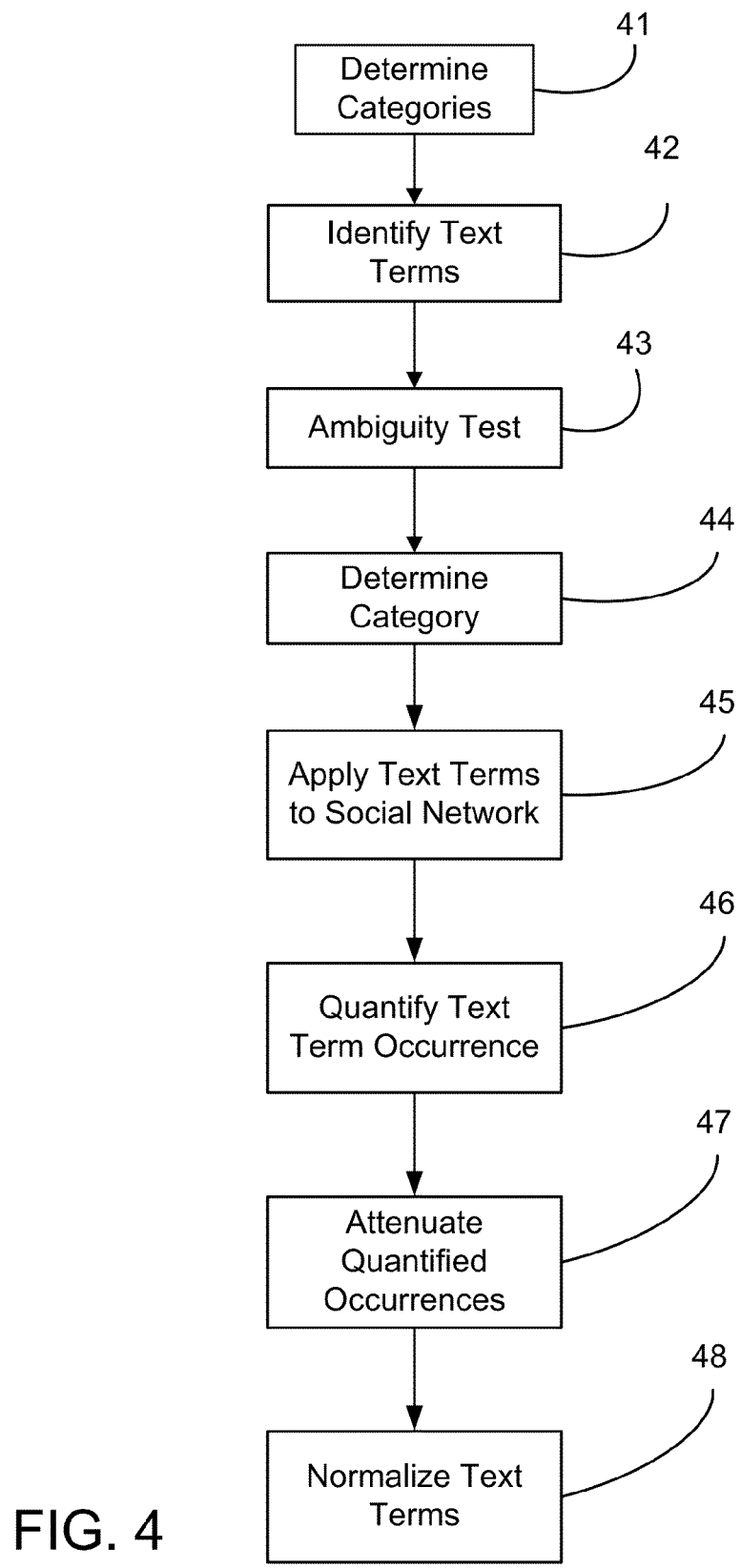
FIG. 4 is a flowchart illustrating a messaging categorization process in accordance with various embodiments of the invention.

Referring now to FIG. 4, a detailed social network categorization process is provided in which categories are built that describe or encompass a particular topic (41). In various embodiments, the categories are built by user interaction and/or via Internet category services in which one or more words or phrases are tabulated or associated with one or more categories. The categories that are distinct and/or entirely contained within another category are utilized that particularly encompass a topic. Generally, a union of categories represent messages of interest that relate to a general overall topic and thus minimization of intersections of such categories are desired to capture or build categories that are distinct to uniquely encompass a particular topic.

Text terms that include key words or phrases of key words are then identified to be associated with the built categories (42). The text terms that do not have another meaning relevant to another category are desired. In one embodiment, text terms are identified by tagging of particular words or phrases via user interaction, database services and/or a combination thereof. In various embodiments, the text terms are identified by the results of a query to match a plurality of messages from a social network messaging service and/or a document or associated document via a URL (uniform resource locator). The text terms can also include the query itself or parts thereof.

The identified text terms are ambiguity tested (43). In one embodiment, one or more text terms are compared to one or more lists of terms previously identified as ambiguous or unambiguous. The list of terms for comparison in one embodiment are provided by Internet database services, user interaction, a previously generated list or is set by the message server. Text terms that are identified as ambiguous are marked accordingly.

If the text terms are identified as unambiguous, the determination of which category the text terms should be associated is performed (44). The text terms in one embodiment are used as a category query to return category results that match the text terms or other terms that are associated with a particular category that match the text terms. In various embodiments, a category query is performed utilizing a predetermined or provided document, webpage or links thereto using TF-IDF cosine similarity and/or a public index of web pages (e.g. DMOZ (Yahoo)).

Based on the results of the category query, the determined categories (41) are refined. In one embodiment, the categories are mapped via user interaction and/or an iterative refinement mapping of each category based on the initially determined category and the category results. Additional categories or sub-categories can also be determined based on such mapped categories. Further refinements to such mapping or text terms can also be performed to remove text terms that do not relate to the determined categories (e.g., a quality assurance action). Logging of such undesired text terms can also assist in further refinements of the mapping and/or determination of the categories.

In one embodiment, the initial lists or text terms for each category table or map are refined or replaced that may also include additional or replacement categories. The initial lists and categories allows the system or server to respond to initial requests or queries and also enables the refinement and growth of the unique text terms and categories. Refinements of terms and categories can also occur by aging the oldest terms or categories or other similar progressive processes that assists in refining the terms and the categories.

The text terms are applied to one or social networks to generate results that identify each text term in one or more messages (45). Stemming, stop words and/or other processes are utilized that assist in expanding or varying the text terms to enhance the generated results to match the text terms to the messages. Stemming for example can include all forms of a text term (e.g., plural, tense, etc.) and stop words, for example, the, and, along with special characters, usernames, codes (e.g., URLs), common names or defined list of special words can also be ignored or removed. In various embodiments, generally text terms that are at least three characters and that are not stop or special words are utilized. Slang, abbreviations or misspelled terms in one embodiment are also used and can be useful for capturing evolving technology and associated terminology as it progresses or changes over time.

The number of occurrences of each text term identified in the one or more messages is quantified (46). In one embodiment, each occurrence is counted or scored such that for each category there is a running count for the text terms that have occurred in the message/search results for that category or topic. A separate or cumulative count can also be maintained for stemming terms. Based on the counts or totals, an ordered list of text terms that relate to a topic can be generated and thus in one embodiment, for each category the text terms are sorted by the counts for the text terms.

The quantified occurrences of each text term for each category are attenuated (47). Attenuation seeks to find or refine the terms that are uniquely indicative/associated with a category. In one embodiment, for every word and the position, count or score in all the categories are examined and the count for a given term based upon the number of topics in which the term scores highly is attenuated. In various embodiments, fractions of its count are taken relative to the occurrences in each topic in which the term scored high (e.g., top 10, top 10%) relative to a scaling factor.

The attenuated keyword (NoT') in one embodiment is based on the following:

$$NoT'=NoT-NoT(3/4)(NuT/M \times Nut)$$

where:
TT=list of keywords and corresponding topics (e.g. [("time",[1,3,17]),("love",[4,5]),("great",[1,2,4,10, 25]), ... ]);
NoT=number of times keyword K in TT appears in topic T;
NuT=number of topics in which K appears in top 10%; and
M×NuT=number of topics for keyword with max NuT in TT.

The attenuated occurrences of each text term for each category are normalized (48). For example, the counts are modified to a range of zero to one with one being identified as a text term that is uniquely associated with a category. Normalization of the text terms allows a comparison of the terms across multiple topics or categories. The normalization of text terms has been previously described in greater detail above.

Therefore, utilizing the categorization process and given a social network message or a string of text terms, the messages may be filtered and/or parsed to identify a set of key words that are scored against all or a set of identified categories. The score of each word for each category is identified and averaged to determine the score of each word per category for the key words from the initial message or text terms. An average of scores prevents longer phrases or text terms providing a higher score than shorter phrases that may result in inaccurate categorization or score of each word. The score per category can thus be provided to a requester or an interested application in various forms. Some non-limiting examples include a list of text terms and relative scores, a list of text terms that exceed a "high" score threshold, a list of categories in which the terms have or exceed a particular score and/or a combination thereof.

Queries and/or updates to the category tables can be performed relatively infrequently. However, as a text term definition changes for example the category tables can be updated. For example, a primarily music performer may also become an actor and thus the category tables may need to be updated to reflect that a text term associated with the music performer for a music category may also be associated with a movie category. Searching on social networks and quantifying text term occurrences can also be done more frequently, e.g., weekly. As such, this may pick up on slang and other trendy or newsworthy updates that are occurring or evolving. Some non-limiting examples include terms that weren't associated with music that are now being associated with music, the term "super" not associated with football normally but become associated in the leading up to occurrence of the "Super Bowl", and so forth.

In one particular example, a webpage advertising a movie is provided. By utilizing the context of the movie being advertised and key words associated with the context or category of the movie, social network messages can be retrieved that match the associated key words such that these messages are displayed on the webpage advertising the movie. As a result, one viewing the webpage advertisement is also exposed to messages or information provided by other users, e.g., not the advertiser, timely and particularly relevant to the advertised movie.

In another particular example, a text box widget or other similar user interface is provided to receive an input of text terms. A category can also be selectable, provided or predefined. Messages relevant to the text terms or related text terms are returned or are accessible by another application or system able to display or otherwise utilize such messages as a search result, aggregate of relevant messages and so on. The messages can also be limited or refined by utilizing other criteria such as time, location, a user or source and the like. In other examples, the identified text terms can be used to automatically provide or populate messages with metadata, tags or other similar associations to categorize messages to enhance the identification and/or retrieval of such messages.

Similarly, an aggregate of messages based on a single condition or category, e.g., belonging to a particular user, can be further categorized based on a set of text terms for one or more categories. As a result, one or more subsets of messages can be provided or identified that relate to a particular category, e.g., movies, music, football, etc., thereby creating multiple messages feeds from a single user or a single source without interaction by the user or source. Accordingly, different message feeds could be retrieved or transmitted to different applications or servers that relevant or useful for the particular application or server.

The system in one embodiment is provided one or more text terms that may have different meanings and without context. The system identifies a potential meaning within a particular context. The meaning and context of the term can then be applied to or received by various other applications or systems to identify and/or build or transmit one or more social network messages. Similarly, such other applications or systems can remove unintended (mistaken) or malicious messages by ignoring or removing social network messages that do not relate to the determined meaning and context of the text terms. In one embodiment, the social network messages include but are not limited to messages having up to 140 characters.

Although the present invention has been described in certain specific aspects, many additional modifications and variations would be apparent to those skilled in the art. It is therefore to be understood that the present invention may be practiced otherwise than specifically described, including various changes in the size, shape and materials, without departing from the scope and spirit of the present invention. Thus, embodiments of the present invention should be considered in all respects as illustrative and not restrictive.

The invention claimed is:

1. A method of textual categorization of social network messages using relevant keywords and a plurality of categories, the method comprising:
   iteratively refining a plurality of categories and determining a plurality of relevant keywords for the plurality of categories using a message server system, where the iteration comprises:
      determining a plurality of relevant keywords for the plurality of categories and determining the relevancy of the plurality of relevant keywords to the plurality of categories using a message server system, where a plurality of relevant keywords is determined for a given category within the plurality of categories by:
         identifying a plurality of relevant keywords for the given category using the message server system;
         retrieving a training data set for the given category using the message server system, where the training data set for the given category comprises a plurality of messages that are retrieved using the identified plurality of relevant keywords;
         calculating a normalized keyword frequency assigned to each of the identified plurality of relevant keywords with respect to the given category using the message server system, where the normalized keyword frequency is determined for a given relevant keyword from the plurality of relevant keywords based upon the frequency with which the given relevant keyword appears within the training data set for the given category; and
         storing the normalized keyword frequencies for the identified plurality of relevant keywords with respect to the given category using the message server system; and
      refining the plurality of categories using the determined plurality of relevant keywords for the plurality of categories and the relevancy of the plurality of relevant keywords to the plurality of categories using the message server system;
   scoring one or more messages retrieved from one or more social network messaging services with respect to a search query and at least one of the determined plurality of categories using the message server system, where scoring a given retrieved message with respect to a particular category from the determined plurality of categories comprises:
      calculating a sum using the normalized frequencies of the plurality of relevant keywords related to the particular category using the message server system, where the sum is determined based at least in part upon the normalized frequencies of any of the plurality of relevant keywords related to the particular category present in the given retrieved message;
      calculating a ratio of search query terms in the given retrieved message to the total number of search query terms using the message server system;
      scoring the given retrieved message based upon the calculated sum and the calculated ratio using the message server system; and
      storing the retrieved message scores using the message server system;
   iteratively refining at least one training data set associated with a particular category using the one or more scored messages identified as relevant to the particular category and the message server system, where a scored message is identified as relevant to the particular category utilizing the retrieved message score for the scored message with respect to the particular category; and
   returning one or more messages having a final score that equals or exceeds a predetermined threshold value for at least one of the determined categories using the message server system.

2. The method of claim 1 further comprising scoring the query based on one or more keywords associated with one or more categories using the message server system to identify the determined category.

3. The method of claim 1 further comprising retrieving the one or more keywords associated with one or more categories from a message database using the message server system.

4. The method of claim 1 wherein the keywords are unambiguous keywords.

5. The method of claim 4 further comprising testing ambiguity of a keywords to generate unambiguous keywords using the message server system.

6. The method of claim 4 further comprising matching keywords to a text database to generate unambiguous keywords using the message server system.

7. The method of claim 4 further comprising establishing one or more categories using the message server system through matching keywords to a category database.

8. The method of claim 7 further comprising associating the unambiguous keywords to the established categories using the message server system.

9. The method of claim 8 further comprising adding or removing one or more keywords to the established categories using the unambiguous text terms and the message server system.

10. The method of claim 1 further comprising counting a number of occurrences of a keyword relative to a plurality of messages from one or more social messaging services to determine the keyword frequency calculations for the keywords using the message server system.

11. The method of claim 10 further comprising attenuating the counts for the one or more keywords using the message server system.

12. The method of claim 11 further comprising normalizing the attenuated counts for the one or more keywords using the message server system.

13. The method of claim 11, further comprising adjusting the keyword frequency calculations using the message server system, wherein adjusting the keyword frequency calculations comprises repeatedly counting a number of occurrences of a keyword relative to a plurality of messages from one or more social messaging services using the message server system.

14. A message categorizer, comprising:
scored message storage configured to store scored messages;
memory configured to store a textual categorization application, one or more keyword frequencies, one or more message scores, and one or more messages; and
a processor;
wherein the textual categorization application configures the processor to:
iteratively determine a plurality of relevant keywords for a plurality of determined categories and determine the relevancy of the plurality of relevant keywords to the plurality of determined categories using a message server system, where a plurality of relevant keywords is determined for a given determined category within the plurality of determined categories by:
identifying a plurality of relevant keywords for the given determined category;
retrieving a training data set for the given determined category, where the training data set for the given determined category comprises a plurality of messages that are retrieved using the identified plurality of relevant keywords;
calculating a normalized keyword frequency assigned to each of the identified plurality of relevant keywords with respect to the given category, where the normalized keyword frequency is determined for a given relevant keyword from the plurality of relevant keywords based upon the frequency with which the given relevant keyword appears within the training data set for the given category;
storing the normalized keyword frequencies for the identified plurality of relevant keywords with respect to the given category using the memory;
score one or more messages from one or more social network messaging services with respect to a search query and at least one of the predetermined plurality of categories by:
calculating a sum using the normalized frequencies of the plurality of relevant keywords related to the particular category, where the sum is determined based at least in part upon the normalized frequencies of any of the plurality of relevant keywords related to the particular category present in the given retrieved message;
calculating a ratio of search query terms in the given retrieved message to the total number of search query terms;
scoring the given retrieved message based upon the calculated sum and the calculated ratio; and
storing the retrieved message scores using the memory;
iteratively refine the plurality of determined categories using the relevant keywords;
iteratively refine at least one training data set related to a given determined category using the relevant keywords; and
return one or more messages having a final score that equals or exceeds a predetermined threshold value for at least one of the determined categories.

15. The message categorizer of claim 14, wherein the textual categorization application further configures the processor to score the query based on one or more keywords associated with one or more categories to identify the determined category.

16. The message categorizer of claim 14, wherein the textual categorization application further configures the processor to retrieve the one or more keywords associated with one or more categories from a message database.

17. The message categorizer of claim 14, wherein the textual categorization application further configures the processor to test the ambiguity of a keyword to generate unambiguous text terms.

* * * * *